United States Patent
Caliskan et al.

(10) Patent No.: US 10,688,854 B2
(45) Date of Patent: Jun. 23, 2020

(54) ELECTRIC VEHICLE WITH INTEGRATED BATTERY AND FLOOR ASSEMBLY

(71) Applicant: Ford Global Technologies, LLC, Dearborn, MI (US)

(72) Inventors: Ari Garo Caliskan, Canton, MI (US); Peter A. Friedman, Ann Arbor, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 15/935,561

(22) Filed: Mar. 26, 2018

(65) Prior Publication Data
US 2019/0291556 A1    Sep. 26, 2019

(51) Int. Cl.
*B60K 1/04* (2019.01)
*B60L 50/64* (2019.01)
*B62D 21/02* (2006.01)

(52) U.S. Cl.
CPC .............. *B60K 1/04* (2013.01); *B60L 50/64* (2019.02); *B60K 2001/0422* (2013.01); *B60K 2001/0438* (2013.01); *B62D 21/02* (2013.01)

(58) Field of Classification Search
CPC .... B60K 2001/0438; B60K 2001/0433; B60K 1/04; B62D 25/20; B60N 2/015
See application file for complete search history.

(56) References Cited

U.S. PATENT DOCUMENTS

| | | | | |
|---|---|---|---|---|
| 5,501,289 A * | 3/1996 | Nishikawa | | B60K 1/04 180/68.5 |
| 5,833,023 A | 11/1998 | Shimizu | | |
| 6,145,910 A * | 11/2000 | Baldas | | B60N 2/01583 248/503.1 |
| 6,886,884 B2 * | 5/2005 | Bull | | B62D 25/20 296/187.08 |
| 7,073,824 B2 * | 7/2006 | Uhara | | B60K 15/063 220/4.14 |
| 7,926,601 B2 * | 4/2011 | Ono | | B60K 15/063 180/65.31 |
| 8,696,051 B2 | 4/2014 | Charbonneau et al. | | |
| 8,960,781 B2 | 2/2015 | Rawlinson et al. | | |
| 9,045,030 B2 * | 6/2015 | Rawlinson | | B60K 1/04 |
| 9,073,451 B1 * | 7/2015 | Wurzer | | B60N 2/015 |
| 9,540,055 B2 | 1/2017 | Berger et al. | | |
| 9,919,619 B2 * | 3/2018 | Perlo | | B62D 23/005 |
| 9,944,160 B2 * | 4/2018 | Nakamura | | B60K 1/04 |
| 9,956,861 B2 * | 5/2018 | Nomura | | B60K 1/04 |

(Continued)

OTHER PUBLICATIONS

Uwai et al., Development of Body Structure for Crash Safety of the Newly Developed Electric Vehicle, Nissan Motor Co., Ltd, Paper No. 11-0199, 7 pages.

*Primary Examiner* — Emma K Frick
(74) *Attorney, Agent, or Firm* — Dave Coppiellie; Brooks Kushman P.C.

(57) ABSTRACT

A vehicle includes an integrated floor and traction battery support assembly. The assembly includes a floor panel and cross-members each having an upper portion attached to a lower surface of the floor panel and extending laterally across the floor panel. The assembly further includes a battery tray attached to lower portions of the cross-members and cooperating with the lower surface to define a battery-pack enclosure. A battery pack is disposed in the enclosure.

20 Claims, 2 Drawing Sheets

(56) References Cited

U.S. PATENT DOCUMENTS

| | | | | |
|---|---|---|---|---|
| 9,987,913 B2* | 6/2018 | Hara | ................ | B60K 1/04 |
| 10,023,069 B2* | 7/2018 | Kobayashi | ............ | B60L 58/21 |
| 10,112,470 B2* | 10/2018 | Hamilton | ............ | B60K 1/04 |
| 10,118,475 B2* | 11/2018 | Sugizaki | ............ | B60K 1/04 |
| 10,242,835 B2* | 3/2019 | Narisawa | ............ | B60K 1/04 |
| 10,272,759 B2* | 4/2019 | Sudhindra | ............ | B60K 1/04 |
| 2012/0248822 A1* | 10/2012 | Mildner | ............ | B62D 25/20 |
| | | | | 296/193.07 |
| 2014/0284125 A1* | 9/2014 | Katayama | ............ | B60K 1/04 |
| | | | | 180/68.5 |
| 2014/0338999 A1* | 11/2014 | Fujii | ............ | B60K 1/04 |
| | | | | 180/68.5 |
| 2017/0217498 A1 | 8/2017 | Akhlaque-e-rasul et al. | | |
| 2017/0225558 A1* | 8/2017 | Newman | ............ | B62D 25/20 |
| 2017/0305248 A1 | 10/2017 | Hara et al. | | |
| 2018/0194212 A1* | 7/2018 | Hamilton | ............ | B60K 1/04 |
| 2018/0290531 A1* | 10/2018 | Ajisaka | ............ | B60K 1/04 |
| 2018/0312200 A1* | 11/2018 | Kawase | ............ | B62D 25/2036 |
| 2018/0345778 A1* | 12/2018 | Yamanaka | ............ | B60K 1/04 |
| 2019/0210659 A1* | 7/2019 | Choi | ............ | B62D 25/2036 |

* cited by examiner

ELECTRIC VEHICLE WITH INTEGRATED BATTERY AND FLOOR ASSEMBLY

TECHNICAL FIELD

The present disclosure relates to battery support assemblies, and more specifically to battery support assemblies that are integrated with a vehicle floor pan.

BACKGROUND

Vehicles such as battery-electric vehicles and hybrid-electric vehicles contain a traction-battery assembly to act as an energy source for the vehicle. The traction battery may include components and systems to assist in managing vehicle performance and operations. The traction battery may also include high-voltage components, such as multiple battery arrays electrically connected to each other.

Typically, traction-battery assemblies include a support structure that attaches to an underbody of the vehicle. The support structure includes a bottom that supports the arrays, sidewalls, and a top that cooperates with the bottom and sidewalls to enclose the battery arrays.

SUMMARY

According to one embodiment, a vehicle includes an integrated floor and traction battery support assembly. The assembly includes a floor panel and cross-members each having an upper portion attached to a lower surface of the floor panel and extending laterally across the floor panel. The assembly further includes a battery tray attached to lower portions of the cross-members and cooperating with the lower surface to define a battery-pack enclosure. A battery pack is disposed in the enclosure.

The vehicle may further include a pair of laterally spaced rockers. The cross-members may have a first end attached to one of the rockers and a second end attached to the other of the rockers. The vehicle may also include a seat assembly having at least one seat bracket disposed below the floor panel and attached to at least one of the cross-members, at least one seat rail disposed above the floor panel, and at least one fastener connecting the at least one seat rail to the at least one seat bracket.

According to another embodiment, a battery support is integrated with a vehicle floor and seat assembly. The vehicle floor includes a floor panel. A battery tray is disposed under the floor panel. Floor cross-members are disposed between the floor panel and the tray so that an upper surface of the floor panel is generally flat. Each cross-member has an upper portion attached to the floor panel and a lower portion attached to the tray. A seat assembly is secured to the cross-members through the floor panel. The seat assembly may have at least one seat bracket disposed below the floor panel and attached to at least one of the cross-members, at least one seat rail disposed above the floor panel, and at least one fastener extending through the floor panel and connecting the at least one seat rail to the at least one seat bracket.

According to yet another embodiment, a vehicle includes a floor panel and cross-members attached to a lower surface of the floor panel. A battery tray has an upper surface attached to the cross-members. The lower surface and the upper surface cooperating to define a battery enclosure in which the lower surface forms a ceiling of the enclosure. A battery pack is disposed in the enclosure.

Each of the cross-members may have an upper portion attached to the lower surface, a lower portion attached to the upper surface, and at least one sidewall extending from the lower portion to the upper portion. The upper portions may be non-removably attached to the floor panel and the lower portions may be removably attached to the battery tray.

The cross-members may provide the anchoring structure for the vehicle seats. A seat bracket may be disposed below the floor panel and attached to one of the cross-members. A seat rail may be disposed above the floor panel and secured to the seat bracket.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
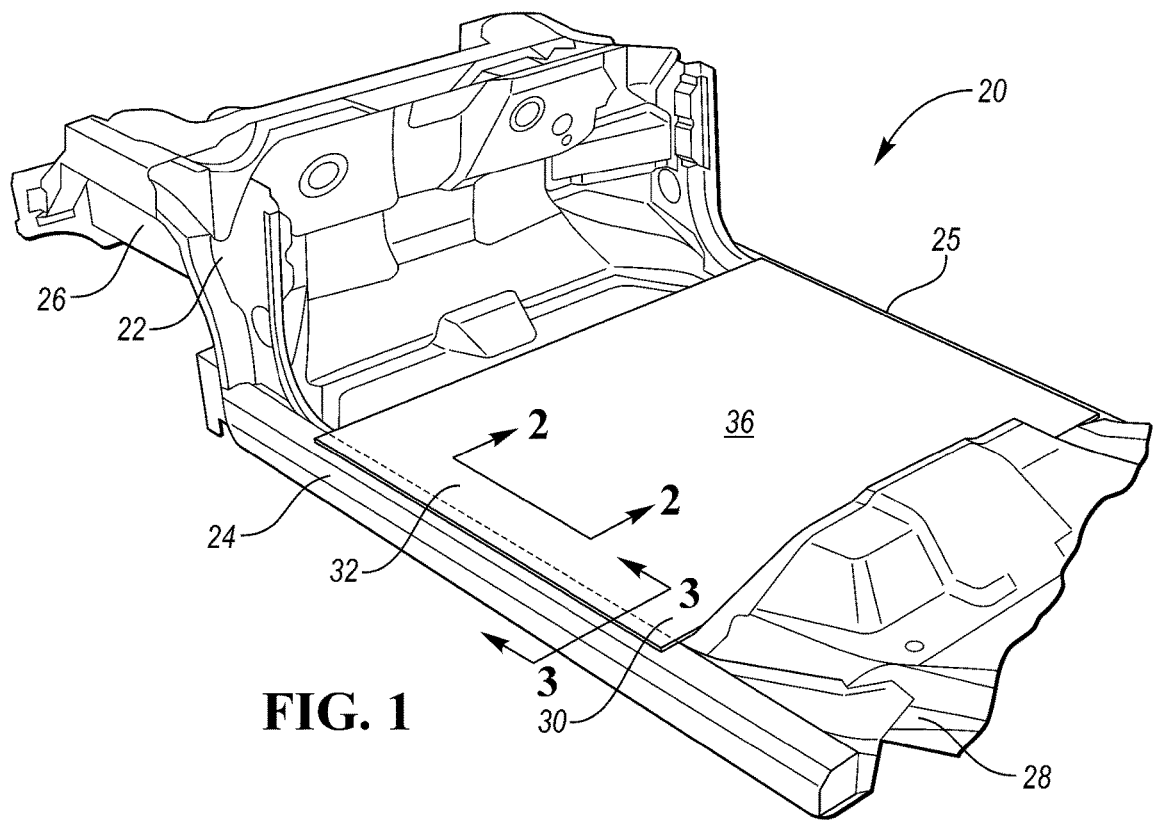
FIG. 1 is a perspective view of a body-in-white vehicle.

Referring to FIG. 1, an electric or hybrid-electric vehicle 20 includes a vehicle body structure 22 having a pair of laterally spaced left and right rockers 24, 25 extending longitudinally through a midportion of the vehicle along a base of the passenger compartment. The rockers 24, 25 connect with front frame rails 26 near the bulkhead of the body structure 22 and connect with rear frame rails 28 near the rear cargo area. A floor pan 30 spans laterally between the rockers 24, 25. The floor pan 30 may include a generally planar panel portion 32 that forms the floor and end portions 34 that are attached to the rockers 24, 25. The upper surface 36 of the panel portion 32 is substantially flat, unlike conventional vehicles which have cross-members attached to the upper surface. The floor pan 30 may include beading, ribs, or dimples to increase strength.

A traction battery is attached to the vehicle 20 under the floor pan 30. The traction battery stores energy that can be used by the electric machine(s) of the vehicle 20. The traction battery typically provides a high-voltage direct current (DC) output from one or more battery cell arrays, sometimes referred to as battery cell stacks, within the traction battery. The battery cell arrays may include one or more battery cells. The battery cells, such as a prismatic, pouch, cylindrical, or any other type of cell, convert stored chemical energy to electrical energy. The cells may include a housing, a positive electrode (cathode), and a negative electrode (anode). An electrolyte may allow ions to move between the anode and cathode during discharge, and then return during recharge. Terminals may allow current to flow out of the cell for use by the vehicle 20. Different battery pack configurations may be available to address individual vehicle variables including packaging constraints and power requirements.

In conventional designs, the floor pan and the traction battery assembly are separate stand-alone assemblies that are individually assembled and then attached to each other. Typically, the traction battery is disposed within a case that includes a tray (bottom), sidewalls and a top that encloses the battery arrays. The case includes mounting flanges for attaching to the rockers of the vehicle to secure the traction battery under the floor pan. The cross-members of the floor pan are disposed on the top surface of the floor pan to provide room for the traction battery assembly.

In contrast to convention designs, the vehicle 20 integrates the floor pan 30 and the traction battery support structure as a single assembly generally denoted by reference numeral 40. This allows the lateral cross-members to be moved below the panel portion 32 to prove an unencumbered floor surface 32 and reduces components as compared to the conventional designs.

Figure 2:
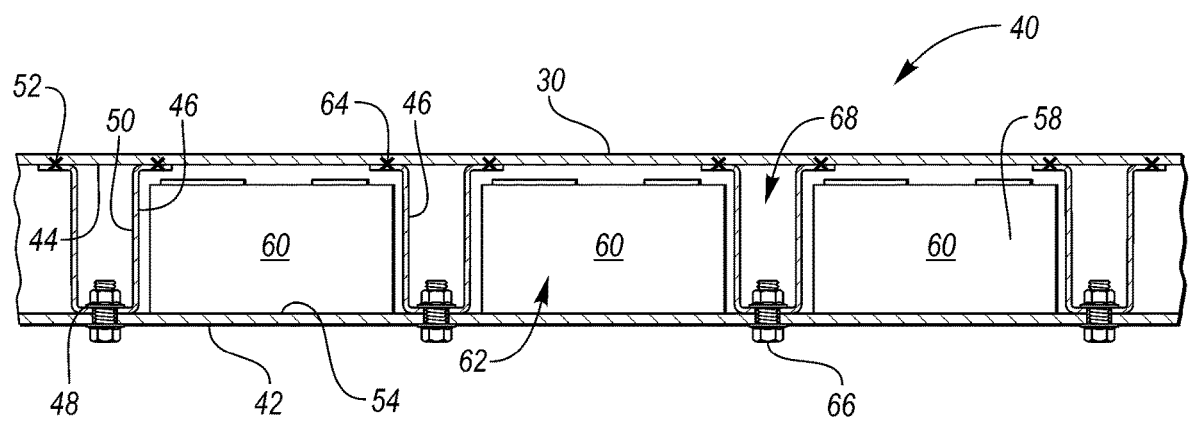
FIG. 2 is a cross-sectional view of an integrated battery and floor assembly of the vehicle at cutline 2-2.

Referring to FIG. 2, the integrated assembly 40 includes the floor pan 30 and a battery tray 42 supported under a bottom surface 44 of the floor pan 30. A plurality of cross-members 46 vertically connect between the floor pan 30 and the tray 42. The cross-members 46 are arranged to extend laterally (cross vehicle) between the rockers 24, 25. A first end of each of the cross-members 46 may be attached the rocker 24 and a second end of each of the cross-members 46 may be attached to the rocker 25. The cross-members 46 may be attached to the rockers 24, 25 by welding, fasteners, or the like. The cross-members 46 are disposed under the floor pan 30 and provide support structure for both the floor pan 30 and the traction battery 58.

The cross-members 46 may be a beam having a U-shaped cross-section, or other cross-sectional shape. The beam may include a base 48, a pair of webs 50 extending upwardly from the base 48, and a pair of flanges 52 extending laterally from the webs 50. In the illustrated embodiment, the base 48 (lower portion) are attached to an upper surface 54 of the tray 42, and the flanges 52 (upper portions) are attached to the bottom surface 44 of the floor pan 30. The cross-members 46 may be non-removably attached to the floor pan 30 by welding 64, riveting, or the like, and the cross-members 46 may be removably attached to the tray 42 by fasteners 66, which may be threaded. In other embodiments, the cross-members 46 may be inverted with the base 48 attached to the floor pan 30 and the flanges 52 attached to the tray 42.

The traction battery 58 is supported by the integrated assembly 40. The traction battery 58 is disposed between the floor pan 30 and the tray 42. The traction battery 58 includes one or more battery arrays 60 that are disposed within cavities 62 defined between adjacent cross-members 46. The individual arrays 60 are electrically connected to each other in series or parallel via conductors that may extend through the cross-members 46. The arrays 60 may include brackets (not shown) that secure the arrays to the tray 42. The floor pan 30 and the tray 42 cooperate to define a battery enclosure 68 in which the tray 42 defines the bottom of the enclosure 68 and the floor pan 30 defines the top of the enclosure.

Figure 3:
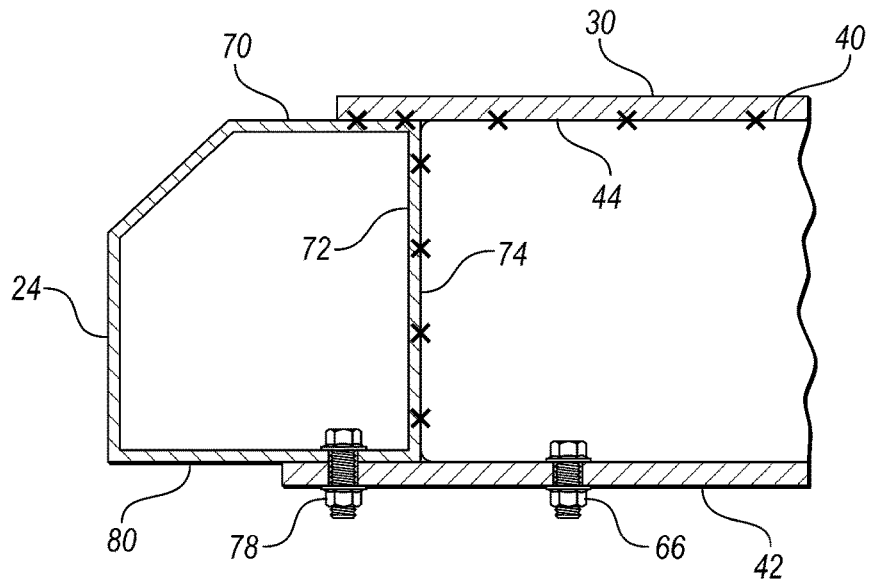
FIG. 3 is a cross-sectional view showing the attachment of the integrated assembly to a rocker of the vehicle at cutline 3-3.

FIG. 3 illustrates the attachment of the integrated assembly 40 to the rocker 24. The rockers 24, 25 may be enlarged as compared to traditional rockers so that the distance between the top 70 and the bottom 80 of the rocker approximates the height between the floor pan 30 and the tray 42. The floor pan 30 may be attached to the rocker 24 via welding, fasteners, or the like. A bottom surface 44 of the floor pan 30 may be disposed against the top 70 as shown in the illustrated embodiment. In other embodiments, an edge portion of the floor pan 30 may be welded to a sidewall 72 of the rocker 24. The first ends 74 of the cross-members 46 are attached to the sidewall 72 via welding, fasteners, or the like. The battery tray 42 may be attached to the bottom 80 of the rocker 24 via fasteners 78 such as bolts. The rocker 25 may be attached to the integrated assembly 40 in a same manner.

Figure 4:
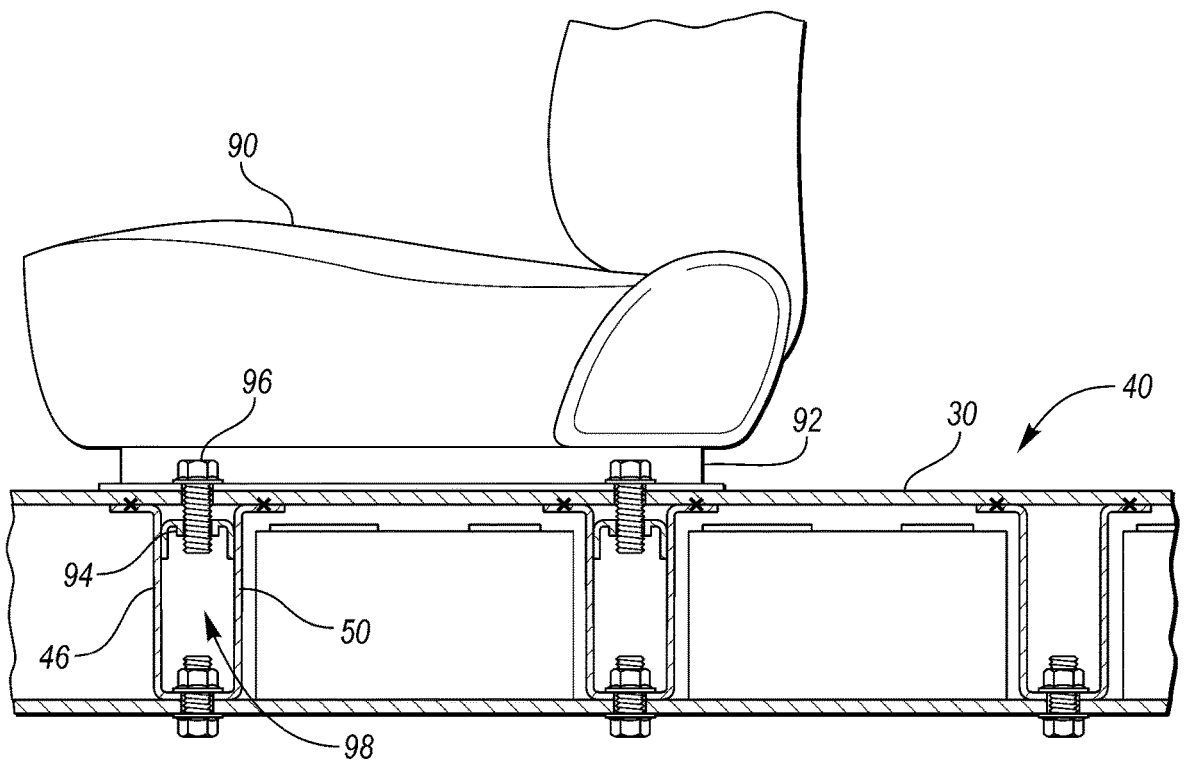
FIG. 4 is a diagrammatical side view showing attachment of a vehicle seat to the integrated battery and floor assembly.

Referring to FIG. 4, seats 90 of the vehicle 20 are connected to the cross-members 46, which are below the floor pan 30. Each of the seats 90 may include one or more rails 92 anchored to one or more of the cross-members 46 by seat brackets 94. In one embodiment, the each of the seats 90 includes a pair of spaced apart rails 92. The seat brackets 94 and the rails 92 may be connected by fasteners 96 that extend through the floor pan 30. The fasteners 96 may be bolts that thread into tapped holes of the brackets 94. The seat brackets 94 are attached to corresponding ones of the cross-members 46 at locations aligned with the rails 92. The seat brackets 94 may be disposed within the channels 98 of the cross-members 46 and attached to the webs 50 by welding or other attachment method.

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and also includes modifications of the illustrated embodiments.

What is claimed is:

1. A vehicle comprising:
 a pair of laterally spaced rockers each having a top, a bottom, and a sidewall extending continuously from the top to the bottom;
 an integrated floor and traction battery support assembly including:
 a floor panel laterally spanning the rockers and having a lower surface disposed on the tops of the rockers,
 cross-members extending laterally across the floor panel and each having an upper portion attached to the lower surface so that an upper surface of the floor panel is free of cross-members to provide an unencumbered upper surface of the floor panel, wherein each of the cross-members has opposing ends, and each of the ends is directly connected to a corresponding one of the sidewalls, and
 a battery tray attached to lower portions of the cross-members and to the bottoms of the rockers, the battery tray cooperating with the lower surface to define a battery-pack enclosure;
 a battery pack disposed in the enclosure;
 seat brackets disposed below the floor panel, each seat bracket being attached to a corresponding one of the cross-members; and
 a seat assembly including:
 a pair of spaced apart elongate seat rails oriented in a longitudinal direction of the vehicle, each of the seat rails being attached to the floor panel by first fasteners extending through the floor panel and threadably engaging corresponding ones of the seat brackets attached to a first one of the cross-members and by second fasteners extending through the floor panel and threadably engaging corresponding ones of the seat brackets attached to a second one of the cross-members, and
 a seat connected to the seat rails.

2. The vehicle of claim 1, wherein the battery tray includes a panel, having an upper surface that is attached to the lower portions.

3. The vehicle of claim 1, wherein each of the cross-members includes a web extending between the upper and lower portions.

4. The vehicle of claim 1, wherein the upper and lower portions are integrally formed.

5. The vehicle of claim 1, wherein the lower surface of the floor panel defines a ceiling of the enclosure.

6. The vehicle of claim 1, wherein the upper portions are non-removably attached to the floor panel, and the lower portions are removably attached to the battery tray.

7. The vehicle of claim 6, wherein the upper portions are attached by welding or riveting, and the lower portions are attached by third threaded fasteners.

8. A battery support integrated with a floor and seat assembly, comprising:
   a floor panel;
   a battery tray disposed under the floor panel;
   floor cross-members disposed between the floor panel and the tray so that an upper surface of the floor panel is free of cross-members, each cross-member including an upper portion attached to the floor panel and a lower portion attached to the tray; and
   a seat assembly including:
      a pair of spaced apart elongate seat rails oriented in a longitudinal direction of the floor panel, each of the seat rails being attached to the floor panel by first fasteners extending through the floor panel and attached to a first one of the cross-members and by second fasteners extending through the floor panel and attached to a second one of the cross-members, and
      a seat connected to the seat rails.

9. The battery support of claim 8 further comprising a traction battery supported on the battery tray.

10. The battery support of claim 8, wherein a lower surface of the floor panel and an upper surface of the battery tray cooperate to define a battery enclosure.

11. The battery support of claim 8, wherein the upper and lower portions are integrally formed.

12. The battery support of claim 8, wherein the upper portions are non-removably attached to the floor panel, and the lower portions are removably attached to the battery tray.

13. The battery support of claim 8, wherein each of the floor cross-members is a beam having a base, a pair of webs extending from the base, and a pair of flanges each extending from one of the webs.

14. The battery support of claim 8, wherein the seat assembly further includes a seat bracket disposed below the floor panel and attached to a corresponding one of the floor cross-members, wherein one of the first and second fasteners is attached to the seat bracket.

15. A vehicle comprising:
   a pair of laterally spaced rockers each having a top, a bottom, and a sidewall extending from the top to the bottom;
   an integrated floor and traction battery support assembly including:
      a floor panel laterally spanning the rockers and having a lower surface disposed on the tops of the rockers,
      cross-members extending laterally across the floor panel and each having an upper portion attached to the lower surface so that an upper surface of the floor panel is free of cross-members to provide an unencumbered upper surface of the floor panel, wherein each of the cross-members has opposing ends, and each of the ends is directly connected to a corresponding one of the sidewalls, and
      a battery tray attached to lower portions of the cross-members and to the bottoms of the rockers, the battery tray cooperating with the lower surface to define a battery-pack enclosure;
   a battery pack disposed in the enclosure;
   seat brackets disposed below the floor panel, each seat bracket being attached to a corresponding one of the cross-members; and
   a seat assembly including a pair of spaced apart elongate seat rails oriented in a longitudinal direction of the vehicle, each of the seat rails being attached to the floor panel by first connections extending through the floor panel and engaging corresponding ones of the seat brackets attached to a first one of the cross-members and by second connections extending through the floor panel and engaging corresponding ones of the seat brackets attached to a second one of the cross-members.

16. The vehicle of claim 15, wherein the seat assembly further includes a seat connected to the seat rails.

17. The vehicle of claim 15, wherein the sidewall extends continuously from the top to the bottom.

18. The vehicle of claim 15, wherein the lower portions are integrally formed with the upper portions.

19. The vehicle of claim 15, wherein the upper portions are non-removably attached to the floor panel, and the lower portions are removably attached to the battery tray.

20. The vehicle of claim 15, wherein each of the cross-members is a beam having a base that forms the lower portion, a pair of webs extending from the base, and a pair of flanges each extending from one of the webs and collectively forming the upper portion.

* * * * *